US008872470B2

(12) United States Patent
Utsumi

(10) Patent No.: US 8,872,470 B2
(45) Date of Patent: Oct. 28, 2014

(54) ELECTRIC DRIVE VEHICLE

(75) Inventor: Shintaro Utsumi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 202 days.

(21) Appl. No.: 13/057,088

(22) PCT Filed: Nov. 12, 2009

(86) PCT No.: PCT/JP2009/069262
§ 371 (c)(1),
(2), (4) Date: Feb. 1, 2011

(87) PCT Pub. No.: WO2011/058630
PCT Pub. Date: May 19, 2011

(65) Prior Publication Data
US 2012/0091790 A1    Apr. 19, 2012

(51) Int. Cl.
*H02J 7/00* (2006.01)
*B60L 11/18* (2006.01)
*B60W 10/06* (2006.01)
*B60W 10/08* (2006.01)
*B60K 6/46* (2007.10)
*B60L 11/12* (2006.01)
*B60W 20/00* (2006.01)
*B60W 10/26* (2006.01)
*B60W 50/08* (2012.01)
*B60L 11/02* (2006.01)

(52) U.S. Cl.
CPC ......... *B60L 11/1816* (2013.01); *B60L 11/1861* (2013.01); *B60W 10/06* (2013.01);

(Continued)

(58) Field of Classification Search
USPC ........................................ 320/104; 180/65.29
See application file for complete search history.

(56) References Cited

U.S. PATENT DOCUMENTS 5,952,813 A * 9/1999 Ochiai ........................ 320/104
6,281,660 B1 * 8/2001 Abe ............................. 320/103

(Continued)

FOREIGN PATENT DOCUMENTS

EP    2 193 967 A1    6/2010
JP    A-50-111715     9/1975

(Continued)

OTHER PUBLICATIONS

International Search Report dated Feb. 16, 2010 in corresponding International Application No. PCT/JP2009/069262 (with translation).

(Continued)

*Primary Examiner* — Edward Tso
*Assistant Examiner* — Ramy Ramadan
(74) *Attorney, Agent, or Firm* — Oliff PLC

(57) ABSTRACT

An electric drive vehicle is equipped with a battery usable for traveling and chargeable by an external power supply and a vehicle-side ECU that permits the battery to be charged by a power generating unit capable of charging the battery in a case where power supplied from the external power supply is smaller than a predetermined threshold value α that is defined with regard to an acceptable power of the battery. More specifically, the vehicle-side ECU permits the battery to be charged by the power generating unit in a case where power supplied from the external power supply is smaller than the predetermined threshold value α and a parallel charging request switch is operated so as to execute parallel charging.

8 Claims, 3 Drawing Sheets

(52) U.S. Cl.
CPC .............. *Y02T 10/7044* (2013.01); *Y02T 90/14* (2013.01); *B60W 10/08* (2013.01); *B60K 6/46* (2013.01); *Y02T 90/127* (2013.01); *Y02T 10/705* (2013.01); *B60L 11/1811* (2013.01); *B60L 11/1862* (2013.01); *B60L 11/126* (2013.01); *B60L 11/123* (2013.01); *Y02T 10/6286* (2013.01); *B60W 20/00* (2013.01); *B60L 11/185* (2013.01); *Y02T 10/6217* (2013.01); *Y02T 90/121* (2013.01); *B60W 10/26* (2013.01); *Y02T 10/6269* (2013.01); *B60W 50/085* (2013.01); *B60L 2240/80* (2013.01); *Y02T 10/7088* (2013.01); *Y02T 90/128* (2013.01); *B60L 2220/20* (2013.01); *Y02T 10/7077* (2013.01); *B60L 11/02* (2013.01); *Y02T 10/7005* (2013.01); *B60W 2710/244* (2013.01)
USPC ......................................... 320/104; 180/65.29

(56) References Cited

U.S. PATENT DOCUMENTS

| | | | |
|---|---|---|---|
| 6,321,707 B1* | 11/2001 | Dunn | 123/179.3 |
| 6,573,688 B2* | 6/2003 | Nakanishi | 320/135 |
| 7,240,653 B2* | 7/2007 | Marchand et al. | 123/179.19 |
| 7,768,229 B2* | 8/2010 | Zhang et al. | 320/104 |
| 2004/0164616 A1* | 8/2004 | Obayashi et al. | 307/18 |
| 2004/0178766 A1* | 9/2004 | Bucur et al. | 320/112 |
| 2008/0067974 A1* | 3/2008 | Zhang et al. | 320/104 |
| 2008/0113226 A1* | 5/2008 | Dasgupta et al. | 429/9 |
| 2009/0250277 A1 | 10/2009 | Grand et al. | |

FOREIGN PATENT DOCUMENTS

| | | |
|---|---|---|
| JP | A-50-114717 | 9/1975 |
| JP | A-10-155205 | 6/1998 |
| JP | A-11-178109 | 7/1999 |
| JP | A-2003-176748 | 6/2003 |
| JP | A-2004-88979 | 3/2004 |
| JP | A-2009-171642 | 7/2009 |
| WO | WO 2009/051185 A1 | 4/2009 |

OTHER PUBLICATIONS

Feb. 5, 2014 Search Report issued in European Patent Application No. 09848581.6.

* cited by examiner

ELECTRIC DRIVE VEHICLE

TECHNICAL FIELD

The present invention relates to electric drive vehicles, and more particularly, to an electric drive vehicle in which a battery can be charged by an external power supply.

BACKGROUND ART

Recently, there have been developed electric drive vehicles such as a hybrid vehicle and an electric vehicle equipped with a battery usable for traveling and chargeable by an external power supply (that is, plug-in charging is possible) (see Patent Document 1, for example).
Patent Document 1: Japanese Patent Application Publication No. 2009-171642

SUMMARY OF THE INVENTION

Problems to be Solved by the Invention

In an electric drive vehicle configured to enable plug-in charging, it is considered that charging from an external power supply utilizes a home-use power supply besides fast charging equipment installed in the public. The home-use power supply is highly convenient, but supplies a small amount of power, as compared to the fast charging equipment. Thus, in this case, it takes a long time to complete charging. In contrast, in a case where the electric drive vehicle is equipped with an engine-driven type of power generating unit having a power generating capacity enough to drive the vehicle, the vehicle may be driven while power is generated by the power generating unit. Thus, in this case, it may be considered that it is not required to charge the battery sufficiently. However, the above case has a difficulty in downsizing the power generating unit, and the energy efficiency of the vehicle is degraded accordingly.

Thus, in the electric drive vehicle, it is desired, in view of energy efficiency, that the battery may be charged more quickly to store a larger amount of charge even when the external power supply only capable of supplying a small amount of power such as the home-use power supply is used, and that it is instead attempted to design the power generating unit so as to have a limited power generating capacity and a reduced size.

The present invention has been made in view of the above problems and aims at providing an electric drive vehicle capable of quickly charging a battery even when an external power supply having a small capacity of supplying power is used.

Means for Solving the Problems

The present invention for solving the problems is an electric drive vehicle equipped with a battery usable for traveling and chargeable by an external power supply, comprising control means for permitting the battery to be charged by a power generating unit capable of charging the battery in a case where power supplied from the external power supply is smaller than a predetermined threshold value that is defined with regard to an acceptable power of the battery.

It is preferable that the present invention is configured to further comprise operation means capable of selecting whether parallel charging of the battery by both the external power supply and the power generating unit should be done, wherein the control means permits the battery to be charged by the power generating unit in a case where the power supplied from the external power supply is smaller than the predetermined threshold value and the parallel charging is selected via the operation means.

It is preferable that the present invention is configured to comprise management means for managing power supplied from at least the power generating unit among the power supplied from the external power supply and the power supplied from the power generating unit.

Effects of the Invention

According to the present invention, it is possible to more quickly charge the battery even in a case where an external power supply having a small capacity is used.

EMBODIMENTS FOR CARRYING OUT THE INVENTION

A description will now be given of embodiments for carrying out the invention with reference to the accompanying drawings.

Figure 1:
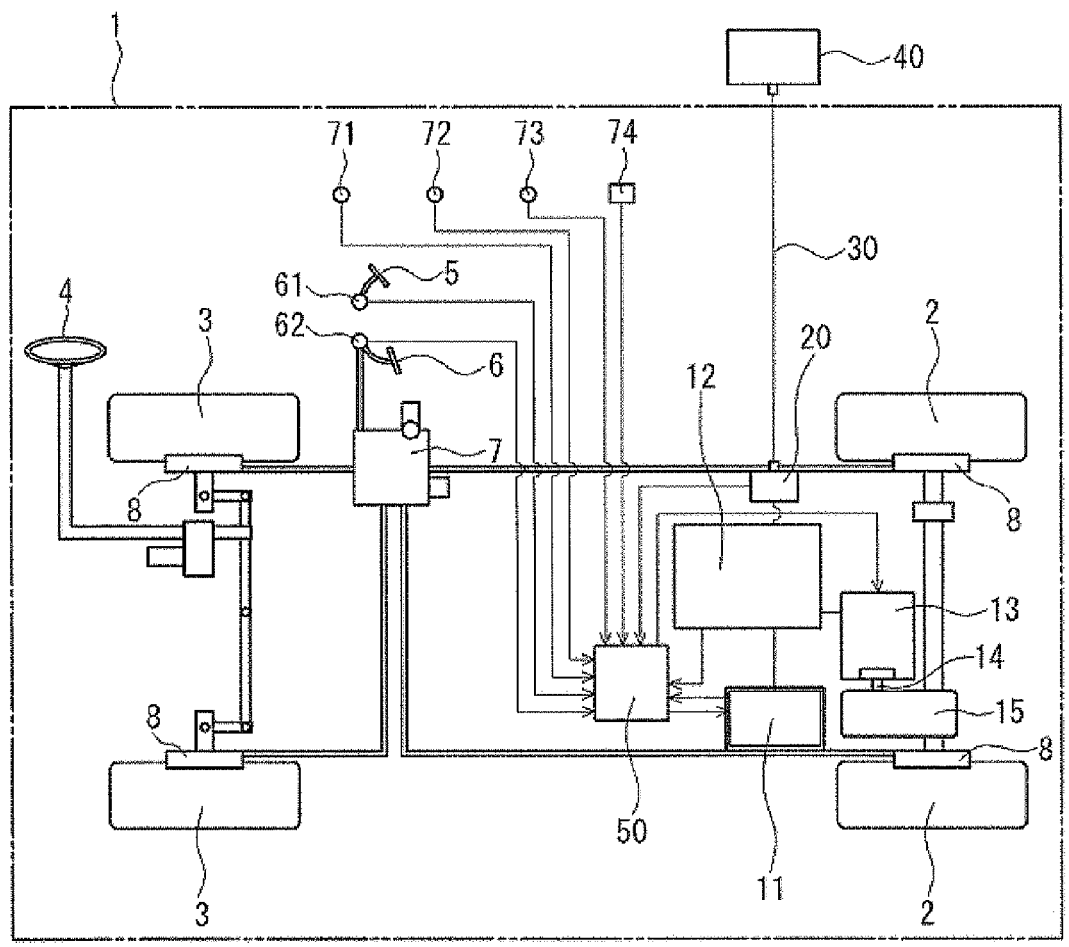
FIG. 1 is a diagram that schematically illustrates an electric drive vehicle 1.

Referring to FIG. 1, an electric drive vehicle 1 is equipped with a power generating unit 11, a battery 12, and an electric motor 13. The power generating unit 11 is detachably installed in the electric drive vehicle 1. The electric drive vehicle 1 with the power generating unit 11 being detachably installed can operate even in a state in which the power generating unit 11 is not installed and an electric connection with the power generating unit 11 is not made. The power generating unit 11 may change the battery 12 even when the power generating unit 11 is not installed in the electric drive vehicle 1 as long as the power generating unit 11 is electrically connected to the electric drive vehicle 1.

Figure 2:
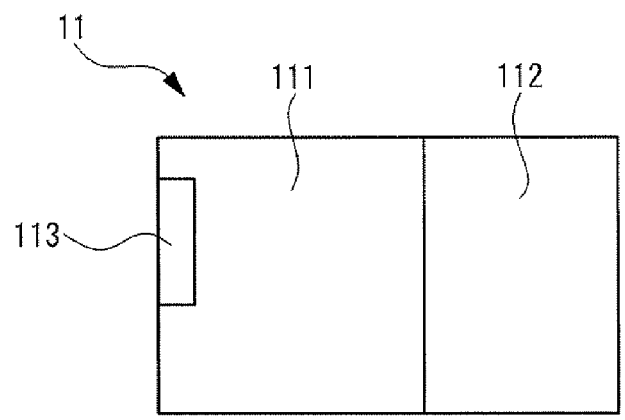
FIG. 2 is a diagram that schematically illustrates a power generating unit 11.

The power generating unit 11 is an engine driven type of power generating unit. As illustrated in FIG. 2, the power generating unit 11 is equipped with an engine 111, a generator 112, and a power generating unit side ECU (Electronic Control Unit) 113. The engine 111 drives the generator 112, which generates alternating current. The alternating current thus generated is converted to direct current by a not-illustrated rectifier circuit before being stored in the battery 12. The ECU 113 on the power generating unit side is provided for primarily controlling the engine 111.

The battery 12 is a DC battery and is electrically and detachably connected to the power generating unit 11 via a high-voltage-system wiring, which is a power wiring. Power generated by the power generating unit 11 is charged in the battery 12 via the high-voltage-system wiring. The battery 12 may be configured to have multiple batteries having a rated voltage of 12 V connected in series. The electric motor 13 is a driving source and is a DC motor. The electric motor 13 is supplied with power from the battery 12 and rotates an output shaft 14. The rotary output is transmitted, via a transmission 15, to a pair of right and left rear wheels 2, which are driving wheels, so that the rear wheels 2 can be driven. As described above, the electric drive vehicle 1 is a series hybrid type of electric drive vehicle.

The electric drive vehicle 1 is equipped, in addition to the pair of right and left rear wheels 2 of the driving wheels, with a pair of right and left front wheels 3 that are steering wheels, a handle 4 for manually steering the front wheels 3, an acceleration pedal 5 for changing the number of revolutions of the electric motor 13, a brake pedal 6 and a brake unit 7 for braking the vehicle, and drum brakes 8 coupled with the brake pedal 6 by wires, joined to the brake unit 7 and provided to the front wheels 2 and the rear wheels 3. The acceleration pedal 5 is provided with an acceleration position sensor 61 that senses the degree of depression of the acceleration pedal 5, and the brake pedal 6 is provided with a brake switch 62 that senses whether the brake pedal 6 is depressed or not.

Further, the electric derive vehicle 1 is equipped with an external charging unit 20. The external charging unit 20 is a device for charging the battery 12 from an external power supply 40. The external charging unit 20 is configured to enable communications by a power line communication (PLC) and has a function of determining whether the external power supply 40 has been connected to the external charging unit 20 or not. The external charging unit 20 is connected to the external power supply 40 via a charging cable 30. More specifically, the external power supply 40 may, for example, be a 100V power supply, a 200V power supply or fast charging equipment.

Further, the electric drive vehicle 1 is equipped with a key switch 71, a parallel charging request switch 72, a fast charging request switch 73, and an operation panel 74. The key switch 71 is an operation means capable of selecting whether to operate the electric motor 13. The parallel charging request switch 72 is an operation means capable of selecting whether parallel charging of the battery 12 by both the external power supply 40 and the power generating unit 11 should be done and an operation means for making a parallel charging request. The fast charging request switch 73 is an operation means capable of selecting whether to generate power so that priority is given to the charge capacity of the power generating unit 11 during parallel charging and is an operation means for making a fast charging request. The operation panel 74 is an operation means capable of specifying various settings regarding charging the battery 12. These switches 71, 72 and 73 and the operation panel 74 are provided on a not-illustrated instrument panel.

The electric drive vehicle 1 is further provided with a vehicle-side ECU 50, which is a first control device. The vehicle-side ECU 50 is equipped with a microcomputer including a CPU, a ROM, and a RAM, and an input/output circuit, which are not illustrated. The ECU 113 on the power generating side, which is a second control device, is configured similarly. The power generating unit 11 (more particularly, the ECU 113 on the power generating unit side) is electrically and detachably connected to the vehicle-side ECU 50. In this regard, more specifically, the vehicle-side ECU 50 and the power generating unit 11 are connected together via a low-voltage-system wiring, which is a control-system wiring. Various objects to be controlled such as the electric motor 13 are electrically connected to the vehicle-side ECU 50, and various sensors and switches such as the acceleration position sensor 61, the brake switch 62, the key switch 71, the parallel charging request switch 73, and the operation panel 74.

The external charging unit 20 is connected to the vehicle-side ECU 50 in order to detect whether the external power supply 40 has been connected, and the battery 12 is also connected thereto in order to detect the quantity of charge stored therein. Further, an ammeter and a voltmeter, which are not illustrated, are connected to the vehicle-side ECU 50 in order to detect power supplied from the external power supply 40. The vehicle-side ECU 50 detects power supplied from the external power supply 40 on the basis of detected values of the ammeter and the voltmeter. Alternatively, the vehicle-side ECU 50 may be notified of the current that can be supplied by the external power supply 40, the voltage of the external power supply 40 and the power that can be supplied by the external power supply 40 by, for example, the external power supply 40 by using the power line communication. Further, other means may be employed in order to implement the detection and notification.

The ROM is configured to store a program in which various processes executed by the CPU are described and to store map data. The CPU executes the processes on the basis of the program stored in the ROM while using a temporary memory area ensured in the RAM as necessary, so that various control means, determination means, detection means and calculation means can be functionally realized in the ECU 50 on the vehicle side and the ECU 113 on the power generating unit side.

For example, the vehicle-side ECU 50 functionally realizes a control means that permits the battery 12 to be charged by the power generating unit 11 in a case where power supplied from the external power supply 40 is smaller than a predetermined threshold value $\alpha$, which is defined with regard to an acceptable power W of the battery 12.

The predetermined threshold value $\alpha$ is a value used to determine whether the parallel charging is permitted or not on the basis of the power capacity of the external power supply 40. In the present embodiment, the predetermined threshold value $\alpha$ is larger than power that can be supplied from a 100V power supply and is smaller than powers respectively supplied from a 200V power supply and the fast charging equipment.

The control means is realized so as to permit the battery 12 to be charged by the power generating unit 11 in a case where power supplied from the external power supply 40 is smaller than the predetermined threshold value $\alpha$ and the parallel charging request switch 72 is operated so as to execute the parallel charging (in a case where the parallel charging request has been issued).

The vehicle-side ECU 50 functionally realizes a management means that manages power supplied to the battery 12 in charging of the pattern 12.

In this regard, the management means is realized so as to manage power supplied from at least the power generating unit 11 among power supplied from the external power supply 40 and power supplied from the power generating unit 11.

In the management of power supplied from the power generating unit 11, the management means is realized to execute a control for operating the engine 111 at a fast charging operating point at which the engine 111 can operate at the maximum output or at an optimal fuel economy operating point at which the engine 111 can operate with an optimal fuel economy on the basis of the capacities of the power generating unit 11 and the external power supply 40 and the presence or absence of the fast charging request, or is realized to execute another control for operating the engine 111 so as to make up power corresponding to the difference between the acceptable power W of the battery 12 and the power that can be supplied by the external power supply 40 (hereinafter, the later control is referred to as a power make-up control).

In execution of the above controls, more particularly, the management means is realized to determine whether the sum of the power supplied from the external power supply 40 and the power supplied from the power generating unit 11 in the state where the engine 111 is operated at the fast charging operating point is smaller than the acceptable power W of the battery 12 (hereinafter, the above sum is referred to as first sum).

When the first sum is smaller than the acceptable power W of the battery 12 and the fast charging request has been issued, the management means is realized to execute the control that operates the engine 111 at the fast charging operating point.

When the first sum is smaller than the acceptable power W of the battery 12 and the fast charging request has not been issued, the management means is realized to execute the control that operates the engine 111 at the optimal fuel economy operating point.

When the first sum is equal to or larger than the acceptable power W of the battery 12, the management means determines whether the sum of the power supplied from the external power supply 40 and the power supplied from the power generating unit 11 in a case where the engine 111 is operated at the optimal fuel economy operating point is smaller than the acceptable power W of the battery (hereinafter, the above sum is referred to as second sum).

When the second sum is smaller than the acceptable power W of the battery 12 and the fast charging request has not been issued, the management means is realized to execute the control that operates the engine 111 at the optimal fuel economy operating point.

When the second sum is smaller than the acceptable power W of the battery 12 and the fast charging request has been issued, the management means is realized to execute the power make-up control.

When the second sum is equal to or larger than the acceptable power W of the battery 12, the management means is realized to execute the power make-up control regardless of whether the fast charging request has been issued.

The management means may be configured to execute the control to operate the engine 111 in an operating condition arranged to give priority to the charge capacity when the fast charging request, for example, is issued as the power make-up control and to execute the control to operate the engine 111 in another operating condition arranged to give priority to the fuel economy when the fast charging request is not issued.

In the management of power supplied from the power generating unit 11, the management means is realized to execute management that depends on the progress of charging. For example, the management means is realized to stop the operation of the engine 111 in a case where the state of charge of the battery 12 becomes larger than a predetermined value β (for example, 80%). For example, the management means is realized to stop the engine 111 in a state in which charging of the battery 12 can be completed by power supplied from the external power supply 40 within a requested charging time γ necessary to complete charging of the battery 12 (hereinafter, such a state is referred to as parallel charging unneeded state). In a case where the predetermined value β or the requested charge time γ is not set, the management means is realized to stop the engine 111 when charging of the battery 12 is complete. The predetermined value β and the requested charge time γ may be set on the operation panel 74.

Figure 3:
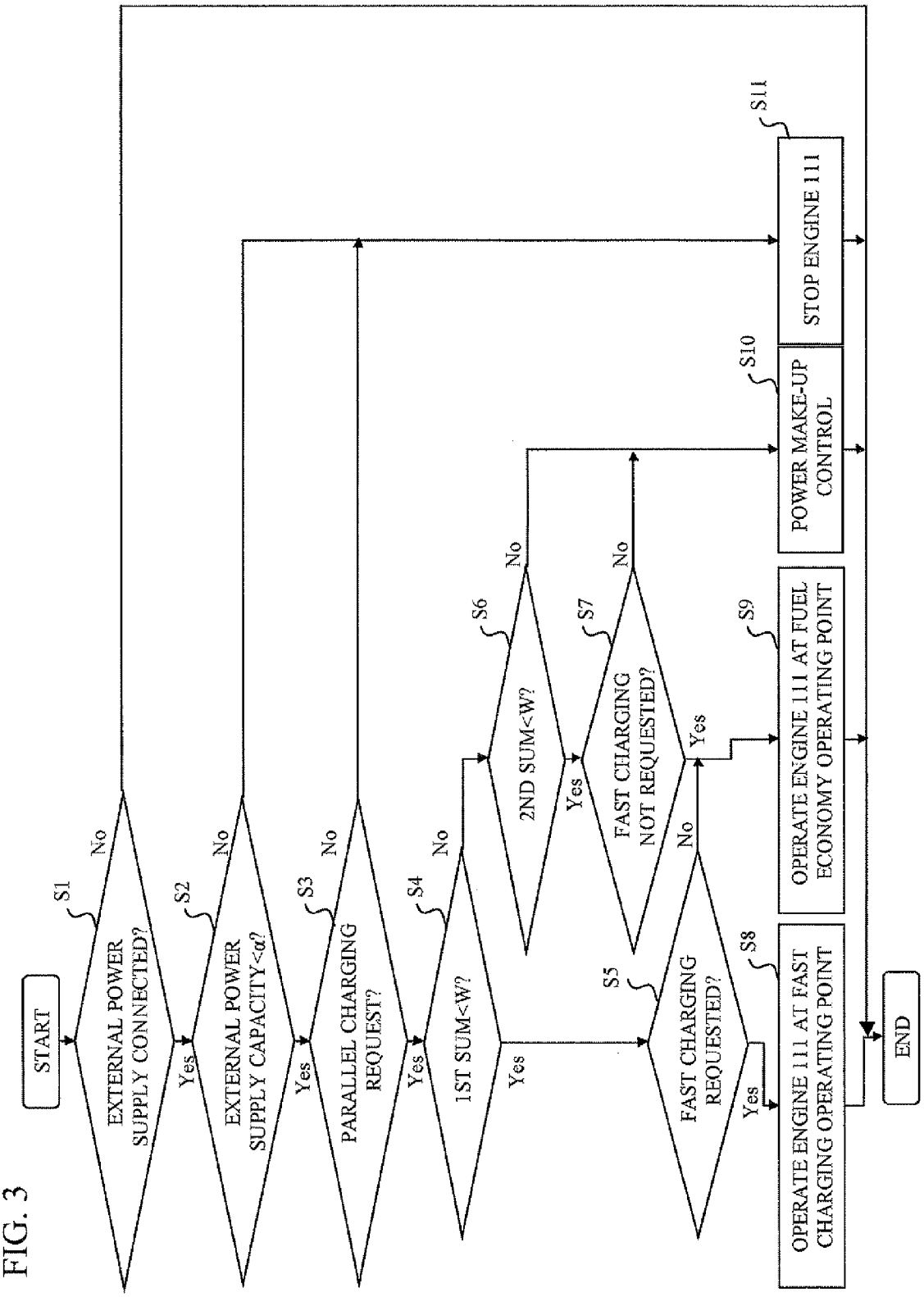
FIG. 3 is a flowchart of an operation of a vehicle-side ECU 50.
Figure 4:
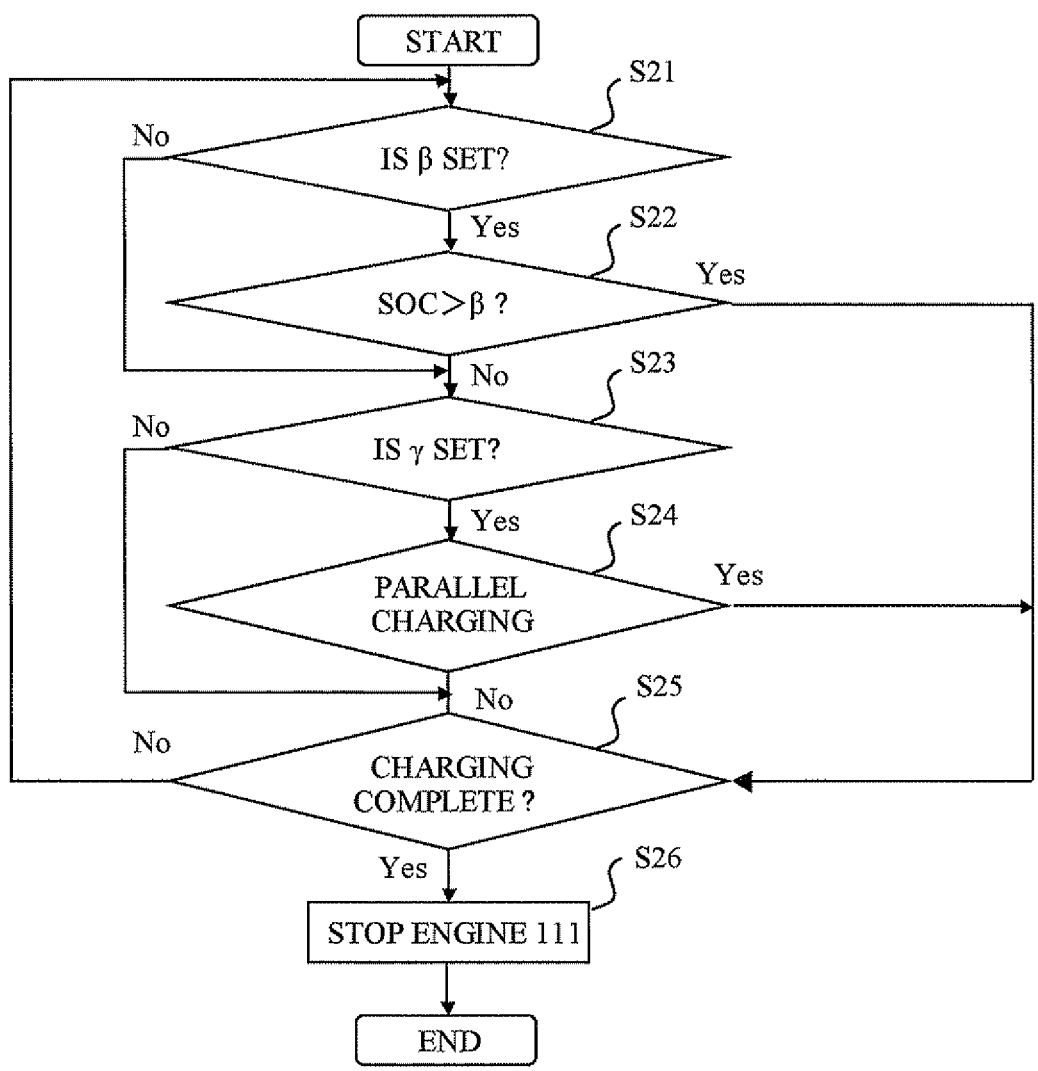
FIG. 4 is a flowchart of another operation of the vehicle-side ECU 50.

Now, a description is given, with reference to flowcharts of FIGS. 3 and 4, of an operation of the vehicle-side ECU 50. As illustrated in FIG. 3, the vehicle-side ECU 50 determines whether the external power supply 40 has been connected (step S1). When a negative decision is made at step S1, no process is needed and the present flow is ended. In contrast, when an affirmative decision is made at step S1, the vehicle-side ECU 50 determines whether power supplied from the external power supply 40 (the capacity of the external power supply) is smaller than the predetermined threshold value α (step S2). When a negative decision is made a step S2, the vehicle-side ECU 50 stops the engine 111 (step S11). At that time, the engine 111 may already be stopped. In this case, the battery 12 is charged by the external power supply 40 only.

In contrast, when an affirmative decision is made at step S2, the vehicle-side ECU 50 determines whether the parallel charging request is issued (step S3). When a negative decision is made at step S3, the process proceeds to step S11. In contrast, when an affirmative decision is made at step S3, the vehicle-side ECU 50 determines whether the first sum is smaller than the acceptable power W of the battery 12 (step S4). When an affirmative decision is made, the vehicle-side ECU 50 determines whether the fast charging request is issued (step S5). When an affirmative decision is made, the vehicle-side ECU 50 operates the engine 111 at the fast charging operating point (step S8). In contrast, when a negative decision is made at step S5, the vehicle-side ECU 50 operates the engine 111 at the optimal fuel economy operating point (step S9).

In contrast, when a negative decision is made at step S4, the vehicle-side ECU 50 determines whether the second sum is smaller than the acceptable power W of the battery 12 (step S6). When an affirmative decision is made, the vehicle-side ECU 50 determines whether no fast charging request is issued (step S7). When it is determined that no fast charging request is issued, the vehicle-side ECU 50 operates the engine 111 at the optimal fuel economy operating point (step S9). In contrast, when it is determined that the fast charging request is issued, the vehicle-side ECU 50 executes the power make-up control (step S10). In the electric drive vehicle 1, the parallel charging is executed as described above when the process proceeds to step S8, S9 or S10.

When the parallel charging is carried out, as illustrated in FIG. 4, the vehicle-side ECU 50 further determines whether the predetermined value β has been set (step S21). When an affirmative decision is made, the vehicle-side ECU 50 determines whether the state of charge (SOC) is larger than the predetermined value β (step S22). When an affirmative decision is made, the vehicle-side ECU 50 stops the engine 111 (step S26). In contrast, when a negative decision is made at step S21 or S22, the vehicle-side ECU 50 determines whether the requested charge time γ has been set (step S23). When an affirmative decision is made, the vehicle-side ECU 50 determines whether the vehicle falls in the parallel charging unneeded state (step S24). A decision as to whether the vehicle falls in the parallel charging unneeded state may be made on the basis of, for example, the acceptable power W of the battery 12, powers respectively supplied from the power generating unit 11 and the external power supply 40, the current charged battery capacity, the requested charging time γ and the remaining time for charging.

When an affirmative decision is made at step S24, the vehicle-side ECU 50 stops the engine 111 (step S26). On the contrary, when a negative decision is made at step S23 or S24, the vehicle-side ECU 50 determines whether charging the battery 12 is completed (step S25). When a negative decision is made, the process returns to step S21. When an affirmative decision is made at step S25, the vehicle-side ECU 50 stops the engine 111 (step S26).

A description is given of functions and effects of the electric drive vehicle 1. In a case where power supplied from the external power supply 40 is smaller than the predetermined threshold value α, the electric drive vehicle 1 is configured to permit the battery 12 to be charged by the power generating unit 11. Thus, in the electric drive vehicle 1, it is possible to charge the battery 12 by the multiple power supplies including the power generating unit 11 and the external power supply 40. Thus, the electric drive vehicle 1 is capable of more quickly charging the battery 12 even in an exemplary case where an external power supply having a small power supply capacity is utilized as the external power supply 40.

In the electric drive vehicle 1, charging of the battery 12 by the power generating unit 11 is permitted when the parallel charging request is issued. Thus, the electric drive vehicle 1 is configured to prevent uneconomical charging of the battery 12 against the user's will due to parallel charging of the battery 12 by the power generating unit 11.

The electric drive vehicle 1 is configured to operate the engine 111 at the fast charging operating point or the optimal fuel economy operating point on the basis of the power supply capacities of the power generating unit 11 and the external power supply 40 and the presence/absence of the fast charging request when the parallel charging is carried out. Thus, in the electric drive vehicle 1, faster charging is realized by operating the engine 111 at the fast charging operating point when the user issues the fast charging request, and economical charging is realized by operating the engine 111 at the optimal fuel economy operating point when the fast charging request is not issued.

Further, the electric drive vehicle 1 is configured to quickly charge the battery 12 by the parallel charging implemented by the power make-up control even when the power supply capacities of the power generating unit 11 and the external power supply 40 are not enough to operate the engine 111 at the fast charging operating point or the optimal fuel economy operating point.

The electric drive vehicle 1 is configured to stop the engine 111 when the state of charge of the battery exceeds the predetermined value β in parallel charging. Thus, in the electric drive vehicle 1, the battery can be quickly charged up to a minimum state of charge of the battery by parallel charging, and thereafter, can be charged more economically by charging by only the external power supply 40 to gain a further state of charge over the minimum state of charge.

The electric drive vehicle 1 is configured to stop the engine 111 when the vehicle falls in the parallel charging unneeded state in parallel charging. In the electric drive vehicle 1, it is possible to prevent the power generating unit 11 from generating more power than is needed in order to complete charging of the battery 12 and realize more economical charging.

The above-described embodiment is an exemplary preferable embodiment. The present invention is not limited to the embodiment but various embodiments and variations for carrying out the invention may be made.

For example, the above-described embodiment is the electric drive vehicle 1 that is a series hybrid type of electric drive vehicle. However, the present invention is not limited to the above but may be a parallel hybrid type of electric drive vehicle in which both the engine and the electric motor can drive the driving wheels concurrently.

In the above-described embodiment, the power generating unit 11, which is detachably installed in the electric drive vehicle 1, is an electric generator. However, the present invention is not limited to the above but the power generating unit capable of charging the battery may be a power generating unit other than the power generating unit detachably installed in the electric drive vehicle.

The above-described embodiment is directed to the case where the predetermined threshold value α is larger than the power that can be supplied from the 100 V power supply and is smaller than the power that can be supplied by the 200V power supply and the fast charging equipment.

However, the present invention is not limited to the above, but the threshold value may be larger than the power that can be supplied by the 200V power supply and is smaller than the power that can be supplied by the fast charging equipment.

In this regard, the acceptable power of the battery may be equal to or greater than the power that can be supplied by the fast charging equipment. In this case, the predetermined threshold value may be equal to or larger than the power that can be supplied by the fast charging equipment and may be equal to or smaller than the acceptable power of the battery.

In the above-described embodiment, the management means is realized so as to manage the power supplied from the power generating unit 11. However, the present invention is not limited to the above, but the management means may further manage power supplied from the external power supply 40. In this regard, for example, the management means may be realized to manage the distribution of power supplied from the external power supply and power supplied from the power generating unit.

More particularly, in an exemplary case where the rates of power supplied from the external power supply are different in different time zones, based on time zone information about the power rates, the ratio of power from the external power supply is increased in a time zone in which the power rates are comparatively low rather than another time zone in which the power rates are comparatively high, while the power supplied from the power generating unit is decreased and may be decreased to zero so that the engine is stopped.

In this case, based on the residual quantity of fuel used for the engine of the power generating unit, it is possible to increase the ratio of power supplied from the external power supply when the residual quantity of fuel becomes a predetermined value, while the power supplied from the power generating unit is decreased and may be decreased to zero so that the engine is stopped.

In a case where the ratio of power supplied from the power generating unit is decreased, it is possible to cause the engine that is operating at the fast charging operating point to operate at the optimal fuel economy operating point, or to stop the engine that is operating at the optimal fuel economy operating point.

The various means functionally realized by the vehicle-side ECU 50 employed in the above-described embodiment may be realized by, for example, other electronic control devices, hardware such as dedicated electronic circuits or combination thereof.

DESCRIPTION OF REFERENCE NUMERALS

1 Electric drive engine
11 Power generating unit
111 Engine
12 Battery
13 Electric motor
20 External charging unit
30 Charging cable
40 External power supply
50 Vehicle side ECU
71 Key switch
72 Parallel charging request switch
73 Fast charging request switch
74 Operation panel

The invention claimed is:

1. An electric drive vehicle equipped with a battery usable for traveling and chargeable by an external power supply, comprising:
   a control part configured to permit the battery to be charged by a power generating unit that is detachably installed in the electric drive vehicle and is capable of charging the battery if power supplied from the external power supply is smaller than a predetermined threshold value that is defined with regard to an acceptable power of the battery;
   the electric drive vehicle being capable of traveling by the battery only even if the power generating unit is detached from the electric drive vehicle,
   wherein the power generating unit includes an engine and a generator that is driven by the engine at a fast charging operating point or an optimal fuel economy operating point when parallel charging of the battery by the external power supply and the power generating unit is performed.

2. The electric drive vehicle according to claim 1, further comprising:
   an operating part configured to determine whether parallel charging of the battery by both the external power supply and the power generating unit should be performed,
   wherein the control part permits the battery to be charged by the power generating unit if the power supplied from the external power supply is smaller than the predetermined threshold value and the parallel charging is selected via the operation part.

3. The electric drive vehicle according to claim 1, further comprising:
   a management part configured to manage power supplied from at least the power generating unit among the power supplied from the external power supply and the power supplied from the power generating unit.

4. The electric drive vehicle according to claim 2, further comprising:
   a management part configured to manage power supplied from at least the power generating unit among the power supplied from the external power supply and the power supplied from the power generating unit.

5. An electric drive vehicle having a battery configured to be charged by an external power supply, the electric drive vehicle comprising:
   a power generating unit detachably installed in the electric drive vehicle and being configured to charge the battery, the power generating unit including an engine and a generator;
   a control part configured to control the power generating unit to charge the battery if a power supply from the external power supply is smaller than a predetermined threshold value of a power amount stored in the battery; and
   the electric drive vehicle being capable of traveling by the battery if the power generating unit is detached from the electric drive vehicle,
   wherein the generator is configured to be driven by the engine at a fast charging operating point or an optimal fuel economy operating point in response to parallel charging of the battery by the external power supply and the power generating unit.

6. The electric drive vehicle according to claim 5, further comprising:
   an operating part configured to determine whether parallel charging of the battery by both the external power supply and the power generating unit is to be performed,
   wherein the control part controls the power generating unit to charge the battery if the power supplied from the external power supply is smaller than the predetermined threshold value and the parallel charging is selected via the operation part.

7. The electric drive vehicle according to claim 5, further comprising:
   a management part configured to manage power supplied from at least the power generating unit based on a power supply amount from the external power supply and the power generating unit.

8. The electric drive vehicle according to claim 6, further comprising:
   a management part configured to manage power supplied from at least the power generating unit based on a power supply amount from the external power supply and the power generating unit.

* * * * *